March 23, 1965   A. J. SOUCY, JR   3,174,552
ROTARY WING AIRCRAFT
Filed Dec. 9, 1963
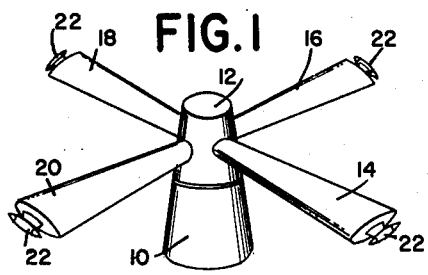
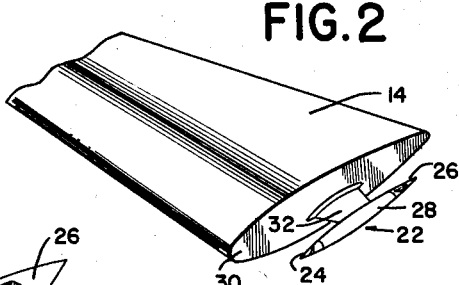
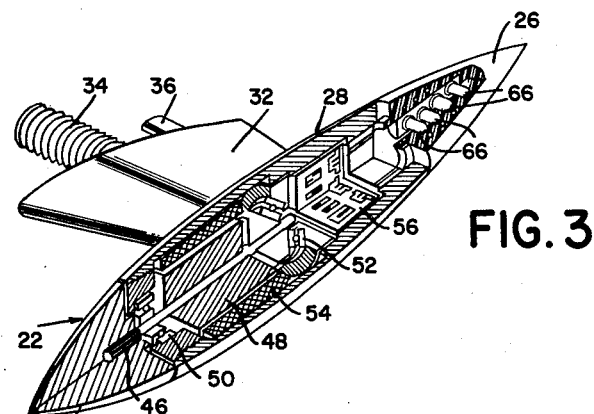
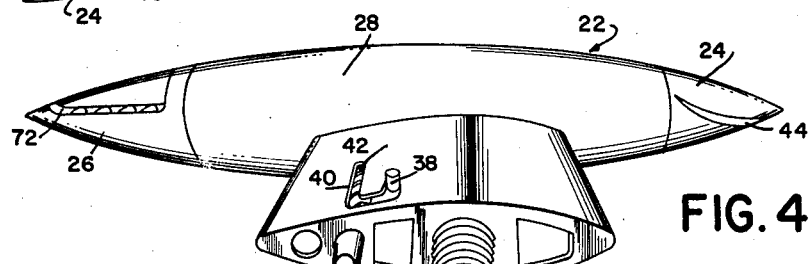
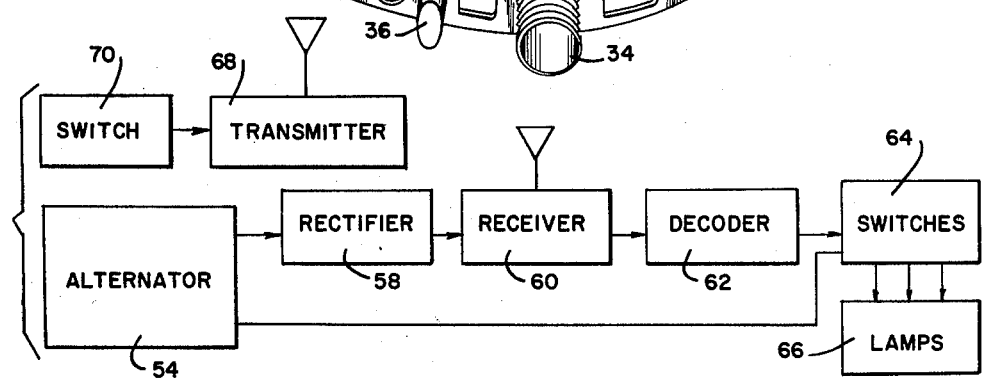
INVENTOR
ARMAND J. SOUCY, JR.
BY Raymond W Colton
ATTORNEY

United States Patent Office 3,174,552
Patented Mar. 23, 1965

3,174,552
ROTARY WING AIRCRAFT
Armand J. Soucy, Jr., Annandale, Va., assignor of twenty percent to Charles Adair, Annapolis, Md.
Filed Dec. 9, 1963, Ser. No. 328,906
8 Claims. (Cl. 170—159)

This invention relates to rotary wing aircraft and particularly such aircraft equipped with an arrangement for illuminating portions of its rotary wings without requiring the use of conductors extending along or through the wings.

It has already been proposed in the patent to Morris, 2,555,807, dated June 5, 1951, to provide wing tip lights for rotary wing aircraft, but there has been no way to control such lights from the cockpit or elsewhere beyond the wings without the use of conductors extending along or through the wings. It is highly undesirable to have such conductors extending through or along the wings for a number of reasons, including weight, balance and the requirement for slip rings where a circuit extends from a fixed part to a moving part of the aircraft.

It is among the objects of the present invention to provide rotary wing aircraft comprising a rotary wing carrying a light source responsive to radiant energy to produce visible light, and a source of radiant energy signals to which the light source is responsive located beyond the rotor. It is contemplated that the source of radiant energy signals be carried by the aircraft and that the rotary wing carry a plurality of light sources responsive to the source of radiant energy signals to produce visible light. Such a plurality of light sources can be made to respond selectively to the source of radiant energy signals for the production of visible light and the source of radiant energy signals in such a case will be provided with means for selectively activating the light sources.

Accordingly, as the wings carrying such light sources rotate, the activation of the light sources can be controlled so as to produce a stroboscopic effect, color variations and/or various signal effects.

It is contemplated that a rotary wing carry an air driven turbine, an electric generator driven by the turbine and a light source capable of being energized by the generator and that a circuit including the generator and light source be provided with switching means together with a radiant energy receiver carried by the wing connected to the switching means and responding to radiant energy signals emanating beyond the rotor for controlling such light source.

A more complete understanding of the invention will follow from a description of the accompanying drawings wherein:

FIG. 1 is a perspective view depicting the wings of a rotary wing aircraft carrying wing tip units incorporating the present invention;

FIG. 2 is a fragmentary perspective view on an enlarged scale of one of the wings of FIG. 1;

FIG. 3 is a partially broken away perspective view, partially in section, on an enlarged scale, depicting one of the wing tip units incorporating the present invention;

FIG. 4 is a perspective view of one of the wing tip units incorporating the present invention; and FIG. 5 is a block diagram exemplifying the electrical aspects of the present invention.

A fixed portion of a rotary wing aircraft has been somewhat diagrammatically illustrated by the housing 10 surmounted by a rotary hub 12 carrying wings 14, 16, 18 and 20, each carrying at its tip a remotely activated illuminating unit 22.

Each unit comprises a spinner 24 at its leading end and a light transmitting member 26 at its trailing end. The intermediate body 28 of the unit is secured to the wing tip closure 30 by means of a support 32 carrying a threaded element 34 which extends through the closure 30 to receive a nut or other securing arrangement. The support 32 is also provided with a retractable pin 36 to extend into or through a suitable opening in the wing tip closure 30 to prevent relative movement of the unit with respect to the wing after assembly. The pin 36 can be retracted by movement of a pin 38 relative to a slot 40 in opposition to the force of a spring 42 which ordinarily maintains the pin 36 in a projected position as depicted in FIGS. 3 and 4.

The spinner 24 contains a slot 44 so that during movement of the wing, the effect of the air engaging the groove or slot 44 will produce rotation of the spinner about its axis. As shown in FIG. 3, the spinner is connected to a splined shaft 46 on which the rotor 48 of a generator is carried. The spinner, shaft and rotor are supported by bearings 50 and 52. As the result of rotation of the rotor 48, current will be induced in the generator stator 54 to supply a number of components exemplified by the printed circuit 56 of FIG. 3, and presented in block diagram form in FIG. 5. The current from the stator of the alternator 54 passes to a rectifier 58 from which it passes to a radiant energy receiver 60 which actuates a decoder 62, which in turn actuates switches 64 to energize various combinations of lamps 66. Cooperating with the radiant energy receiver 60 there is depicted a radiant energy transmitter 68 located at a point beyond the rotor, such as in the fuselage of the aircraft, the transmitter being keyed by means of a switch 70 to produce desired illumination of the lamps or variation thereof so as to produce different colors, stroboscopic effects, signals or other desired sequences of illumination.

As depicted in FIG. 4, the lamps may be shielded so that all of the light emanating therefrom is delivered through a slot 72 in the event that it is desired that light be visible only from a given position relative to the aircraft, such as from above so that the aircraft will be clearly visible to the pilot of another aircraft at a higher altitude.

It will be clear that when the rotor of the aircraft is in motion, rotation of the spinner about its axis will occur, driving the rotor of the alternator 54 whose output will be rectified by the rectifier 58 and controlled by the receiver 60 and the decoder 62 to selectively actuate the switches 64 and energize the lamps 66 in response to signals from the transmitter 68 keyed by the switch 70 under the control of the remote operator, such as the pilot of the aircraft.

Somewhat similar effects can be produced in other ways. For example, a neon tube or an electroluminescent panel carried by one or more of the wings can be energized by a remotely produced high frequency field, or suitable phosphors carried by one or more of the wings can be activated by remotely located sources of ultraviolet light. Whereas these variations are contemplated as coming within the scope of the present invention, the preferred form is that illustrated in the drawings since it lends itself more readily to positive control, promises a higher intensity of illumination and is susceptible to control from one or more sources to produce various effects for signalling, color coding, and/or stroboscopic effects.

I claim:

1. Rotary wing aircraft comprising a rotary wing rotatably mounted with respect to said aircraft and carrying a light source responsive to radiant energy to produce visible light, and a source of radiant energy signals to which said light source is responsive located beyond said wing and with respect to which said wing is rotatable.

2. Rotary wing aircraft according to claim 1 wherein said source of radiant energy signals is carried by said aircraft.

3. Rotary wing aircraft according to claim 1 wherein said rotary wing carries a plurality of light sources responsive to said source of radiant energy signals to produce visible light.

4. Rotary wing aircraft according to claim 1 wherein said rotary wing carries a plurality of light sources selectively responsive to said source of radiant energy signals to produce visible light, and said source of radiant energy signals is provided with means for selectively activating said light sources.

5. In combination with rotary wing aircraft having a relatively rotatable rotary wing carrying an air driven turbine, an electric generator driven by said turbine and a light source capable of being energized by said generator; a circuit including said generator, said light source and switching means; a radiant energy receiver carried by said wing connected to said switching means and responding to radiant energy signals emanating beyond said rotor for controlling said light source; and a source of radiant energy signals beyond said wing for transmitting signals to said receiver.

6. In combination with rotary wing aircraft as defined in claim 5 wherein said source of radiant energy signals is carried by said aircraft for actuating said switching means.

7. In combination with rotary wing aircraft as defined in claim 5 wherein said rotary wing carries a plurality of light sources responsive to said source of radiant energy signals to produce visible light.

8. In combination with rotary wing aircraft as defined in claim 5 wherein said rotary wing carries a plurality of light sources selectively responsive to said source of radiant energy signals to produce visible light, and said source of radiant energy is provided with means for selectively activating certain of said light sources.

References Cited by the Examiner

UNITED STATES PATENTS

| | | | |
|---|---|---|---|
| 1,709,377 | 4/29 | Sperry | 340—25 |
| 2,367,388 | 1/45 | Davis | 244—1 X |
| 2,401,873 | 6/46 | Kendrick | 244—1 |
| 2,423,528 | 7/47 | Stewart | 240—7.7 X |
| 2,524,747 | 10/50 | Ayres et al. | 244—1 X |
| 2,555,807 | 6/51 | Morris | 240—7.7 |
| 2,913,700 | 11/59 | Brody | 244—17.11 X |
| 2,921,289 | 1/60 | Eklund et al. | 244—17.11 X |

FOREIGN PATENTS 676,166    5/39    Germany.

JULIUS E. WEST, *Primary Examiner.*